A. L. LAMBERT.
HINGED SEAT CUSHION.
APPLICATION FILED APR. 14, 1917.
1,312,915.
Patented Aug. 12, 1919.
2 SHEETS—SHEET 1.
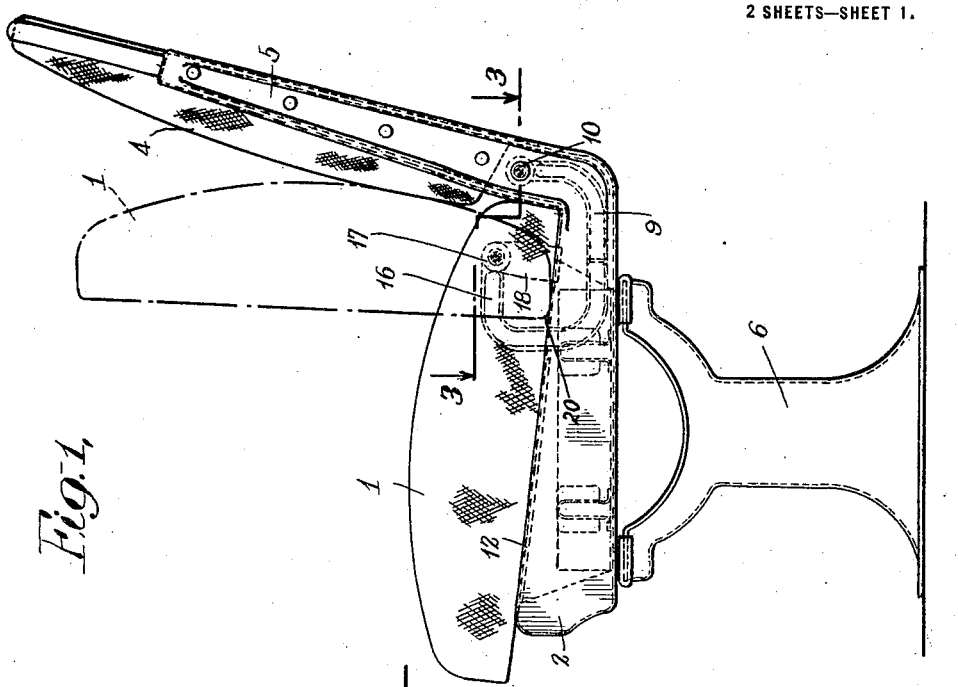
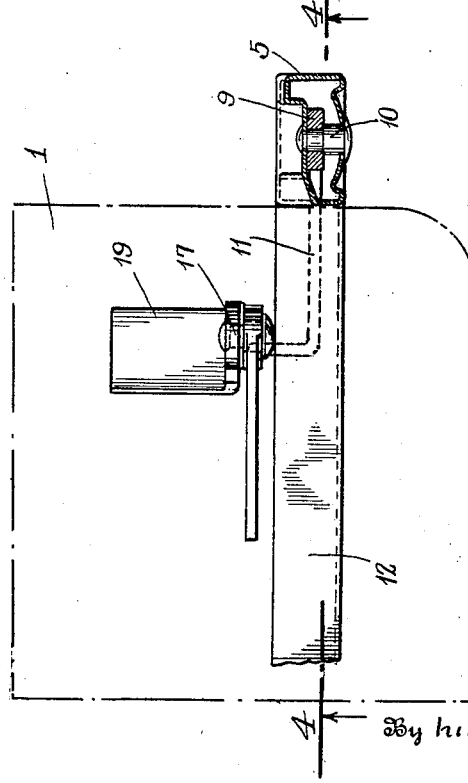
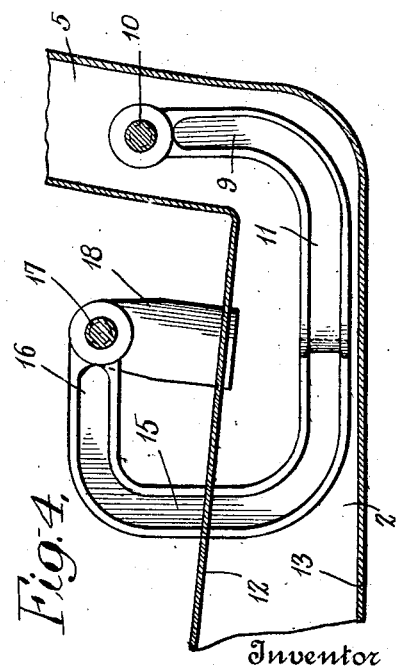
Inventor
Albert L. Lambert
By his Attorney

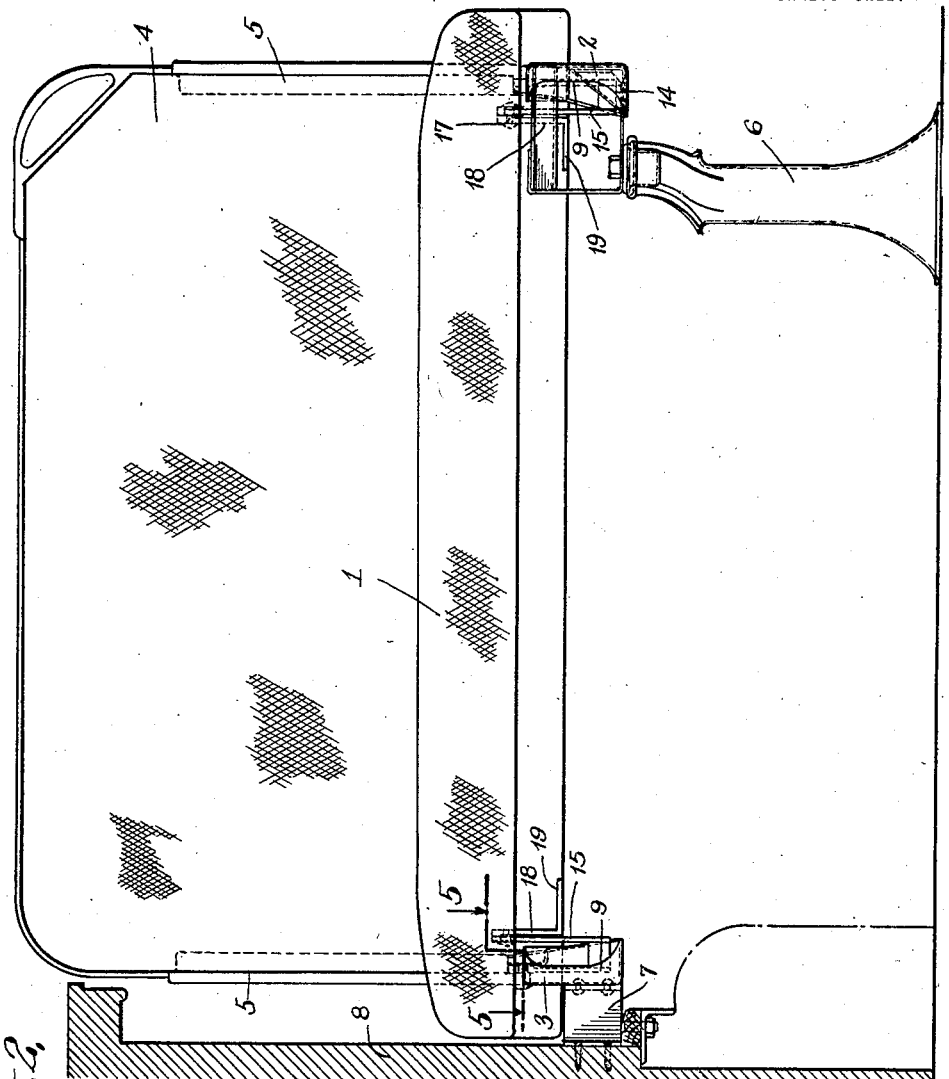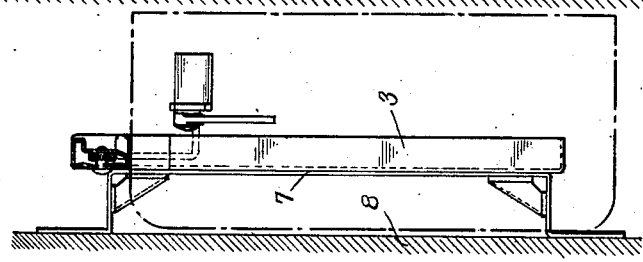

UNITED STATES PATENT OFFICE.

ALBERT LESLIE LAMBERT, OF PHILADELPHIA, PENNSYLVANIA, ASSIGNOR TO HALE & KILBURN CORPORATION, OF PHILADELPHIA, PENNSYLVANIA, A CORPORATION OF DELAWARE.

HINGED SEAT-CUSHION.

1,312,915.   Specification of Letters Patent.   Patented Aug. 12, 1919.

Application filed April 14, 1917. Serial No. 161,937.

*To all whom it may concern:*

Be it known that I, ALBERT LESLIE LAMBERT, a citizen of the United States, residing at Philadelphia, in the county of Philadelphia and State of Pennsylvania, have invented certain new and useful Improvements in Hinged Seat-Cushions, of which the following is a specification.

My invention relates to a hinged seat-cushion device in connection with a car-seat structure of the type in which the back is stationary. My device provides a construction by which the seat-cushion may be swung rearwardly and upwardly into a position in which it rests against a back-cushion. One of the advantages of this construction is that where seats are placed on close centers, the cushion may be turned upward to allow the inside passenger to pass in the case of a seat accommodating two persons. Another advantage is that the cushions may be raised when it is desired to clean the car, and that where a car is left in the barn for some time the cushions may be turned up and are thereby not so liable to gather dust.

The construction is especially designed, so that the seat-cushion, when raised, will remain in its elevated position resting against the back-cushion, or with its normally rear edge resting on the supporting standard with its normally upper surface adjacent to the back-cushion. The device, however, may be modified with a slight change, so that the seat-cushion will not stay in its raised position, but will drop back when released. This construction is deemed preferable in some cases, when it is desired only to use it for the purpose of easier passage into or out of the seat, since the possibility of a passenger not noticing that the seat is out of seating position is obviated. With either construction the design enables the seat-cushion, in its upwardly swinging movement, to clear the adjacent horizontal supporting surface, the back-cushion supports, and the curved forwardly projecting surface of the back-cushion. Accordingly, a pair of links are provided each of which is pivoted at one end to the back standard and at the other end to the interior of the seat-cushion, these pivotal points being so located as to render possible the swinging of the seat-cushion into its upper position in which it will remain, in my preferred construction, until again drawn down as stated. In the preferred construction, these pivoted links are entirely out of sight, passing downwardly on the inner sides of the back standards, then forwardly adjacent the inner surfaces of the seat-cushion supports, then upwardly into the interior of the seat-cushion and thence rearwardly to the points of pivotal connection to the seat-cushions.

In order that a clearer understanding of my invention may be had, attention is hereby directed to the accompanying drawings forming part of this application and illustrating one embodiment of my invention. In the drawings, Figure 1 represents an end view of a car-seat, Fig. 2 is a front view of the same, Fig. 3 is a horizontal partial section on line 3—3 of Fig. 1, Fig. 4 is a partial vertical section taken on line 4—4 of Fig. 3, and Fig. 5 is a partial horizontal section taken on line 5—5 of Fig. 2.

Referring to the drawings, the seat-cushion 1 normally rests upon a pair of horizontal arms or supports 2 and 3, and the back-cushion 4 is secured to a pair of upwardly extending standards 5, 5. In the embodiment illustrated, the upwardly extending arms or standards 5, 5 are integral with the horizontal seat supports 2, 3. The horizontal support 2 at the aisle end of the seat is mounted upon a pedestal 6, and the horizontal arm 3 at the wall end is supported by being secured to a bracket 7 which is secured to the adjacent wall 8, although it is, of course, obvious that the standard at the wall end may be supported in a different manner. The seat-cushion normally seats with its rear edge against or closely adjacent to the standards 5, below the overhang of back-cushion 4.

For giving the seat-cushion its pivotal movement, a pair of links 9, 9 are provided. One end of each link is pivoted on a rivet 10 extending through the adjacent back standard 5 at a point to the rear of the seat-cushion and preferably some distance above the lower edge of the seat-cushion. Preferably, the combined seat and back supporting standard 2, 5 or 3, 5 is of pressed metal flanged to channel shape and having a box-section adjacent the intersection of the horizontal and vertical arms. The rivet or pivot pin 10 on which link 9 is pivoted is supported in this portion of box-section as shown.

Each link 9 extends downwardly from its pivot 10 on the inner side of the back standard and is then bent to extend forwardly, as is shown at 11 in Fig. 4, the forwardly extending portion 11 being adjacent to the inner surface of the web of the horizontal arm 2 of the standard, between the upper and lower flanges 12 and 13 of this arm. Each link is then bent inwardly lengthwise of the seat, as is shown at 14 in Fig. 2, and thence extends upwardly, as is shown at 15, past the upper flange 12 of supporting arm 2 and into the interior of the seat-cushion. The link thence extends rearwardly a short distance, as is shown at 16, to its end at which it is pivoted on a pin or rivet 17. Rivet 17 is carried by a bracket 18 which extends upwardly from a foot portion 19 which is screwed or otherwise secured to the slats or other frame members of the seat-cushion.

With the construction described, the pivoted link and hinge construction is entirely out of sight at all times, except that the portions 15 of the links are visible when the cushion is turned upward into the position shown in dotted lines in Fig. 1. The pivots 10 and 17 are so located that when the cushion is raised, its rear edge is not obstructed by the back standards. As the cushion is raised, there is a pivotal movement of the cushion about pivots 17 and also pivotal motion of the links about pivots 10, the links rising somewhat as the rear lower corner of the seat-cushion rides over the top surfaces of arms 2. When this point has been passed, the links may drop back into their former position, the seat-cushion resting with its normally rear edge upon the top flanges 12 of arms 2 and its normally upper surface contacting the back-cushion 4, as is shown in dotted lines in Fig. 1. In this position, the center of gravity of the seat-cushion is approximately above or somewhat to the rear of pivots 17, so that there is no tendency for the seat-cushion to fall back into its normal position. Also, the rear surface of the seat-cushion is preferably substantially squared to form a firm bearing for the seat-cushion on arms 2 when the cushion is raised. The seat-cushion might be supported in this position, however, by having portions 9 of the pivoted links rest on the lower flanges of arms 2.

It is obvious that the pivots 17 may be moved a little to the rear of the position shown, when it is desired to have the seat-cushion drop upon release. In this case the rear upper surface of the seat-cushion will come into contact with the lower surface of the back-cushion before the seat-cushion has been tilted quite to a vertical position, the cushion resting on its corners 20. Since the center of gravity is now forward of the corners 20, the seat will drop upon being released.

The seat-cushion may be supported in its seating position by merely resting on the upper flanges of arms 2, or, if desired, the usual pins extending upwardly from the upper surfaces of arms 2 into corresponding openings in the seat-cushion may be used.

It should be understood that my invention is not limited strictly to the details of construction described, but that equivalents therefor may be employed within the scope of the appended claims.

What I claim is:—

1. In a car-seat, the combination of a pair of standards, having horizontal and upwardly extending arms, a back-cushion secured to the latter, a seat-cushion adapted to rest on the former, with its rear edge adjacent to said upwardly extending arms and beneath, and closely adjacent to, the back-cushion, and a pair of parallel links, each pivoted at one end to an arm to the rear of the seat-cushion, the link thence extending downwardly alongside the upwardly extending standard arm, thence forwardly alongside the horizontal standard arm, and thence upwardly to a pivotal connection with the seat-cushion, located toward the rear edge thereof, substantially as set forth.

2. In a car-seat, the combination of supports for seat and back cushions, a back-cushion secured to the latter, a seat-cushion adapted to rest on the former, with its rear edge adjacent to the back supports, beneath the back-cushion, and a pair of parallel bent links each pivoted at the rear end to the back support and at the front end to the interior of the seat-cushion, toward the rear edge thereof, said links being located on the inner sides of said supports and hidden from view thereby, and the pivotal points of said links being so chosen that the seat-cushion may be swung, without interference from the back-cushion and supports, into raised position against the back-cushion, substantially as set forth.

3. In a car-seat, the combination of supports for seat and back cushions, a seat-cushion adapted to rest on the former, a back-cushion secured to the latter, and a pair of parallel bent links, each pivoted at the rear end to a support and at the front end to the seat-cushion toward the rear edge thereof, the pivots being so located that the seat-cushion may be swung into approximately vertical position, with the rear edge of the cushion resting on the supports for the seat-cushion without interference from the back-cushion and supports, said seat-cushion normally seating with its rear edge adjacent to the back supports, beneath, and closely adjacent to, the back-cushion, substantially as set forth.

4. In a car-seat, the combination of supports for seat and back cushions, a seat-cushion adapted to rest on the former, a back-cushion forwardly extending from the latter, and parallel links, pivoted at the rear to the back-support to the rear of the seat-cushion, and at the front to the interior of the seat-cushion, the pivotal points being so located that the seat-cushion may be swung into approximately vertical position without interference from the back-cushion and supports, said seat-cushion normally seating with its rear edge adjacent to the back supports, beneath and closely adjacent to the back-cushion, substantially as set forth.

5. In a car-seat, the combination of supports for seat and back cushions, a seat-cushion adapted to rest on the former, a back-cushion forwardly extending from the latter, and parallel links, one at each end of the seat, each pivoted at the rear end to the back support and at the front end to the seat-cushion toward the rear edge thereof, the pivots of said links being so located that the seat-cushion may be swung, without interference from the back-cushion and supports, into approximately vertical position with the rear edge of the cushion above the seat-cushion supports, and the rear surface of the seat-cushion resting against the front surface of the lower portion of the back-cushion, said links being so located on the inner sides of said supports as to be practically hidden from view thereby, and constituting the sole limiting connection between said seat-cushion and supports, and said seat-cushion normally seating with its rear edge adjacent to the back-supports, beneath, and closely adjacent to, the back-cushion.

6. In a car-seat, the combination of supports for seat and back cushions, a seat-cushion adapted to rest on the former, a back-cushion forwardly extending from the latter, and parallel links, one at each end of the seat, each pivoted at the rear end to the back support and at the front end to the seat-cushion toward the rear edge thereof, said cushion normally seating with its rear edge adjacent to the back-supports, beneath, and closely adjacent to, the back-cushion, the pivots of said links being so located that the seat-cushion may be swung without interference from the back-cushion and supports, into approximately vertical position with its rear edge above the seat-cushion supports and its rear surface resting against the front surface of the back-cushion, said links swinging upwardly about their rear ends sufficiently to cause the bottom rear edge of the seat-cushion to clear its supports and the seat-cushion swinging about the forward ends of said links to clear said back-cushion, and said links swinging again downwardly when the bottom rear edge of the seat-cushion has cleared its supports.

This specification signed and witnessed this 10 day of April, 1917.

ALBERT LESLIE LAMBERT.

Witnesses:
W. H. RICHARDS, Jr.,
WILLIAM J. EARNSHAW.

Copies of this patent may be obtained for five cents each, by addressing the "Commissioner of Patents, Washington, D. C."